April 14, 1931.  H. BULLNHEIMER  1,800,433
TWO-CYCLE ENGINE WITH SLOT SCAVENGING
Filed Aug. 17, 1929   3 Sheets-Sheet 3
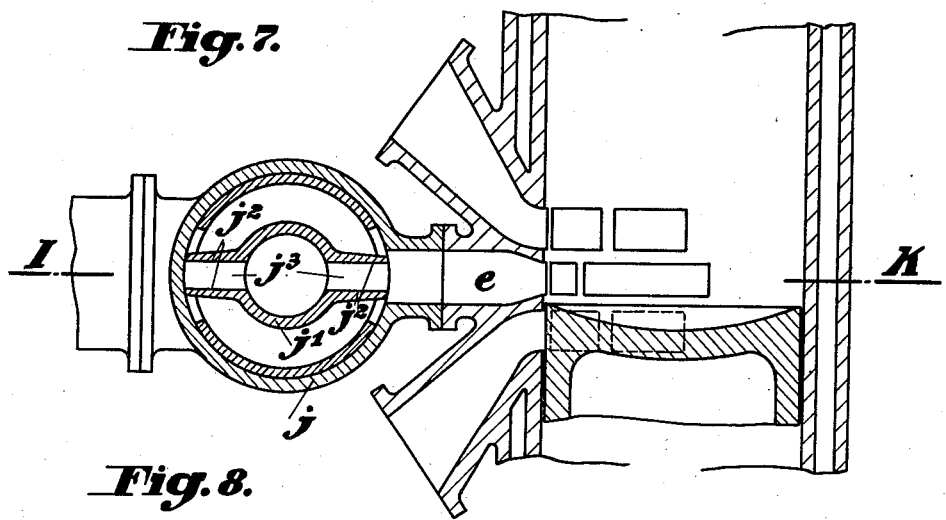
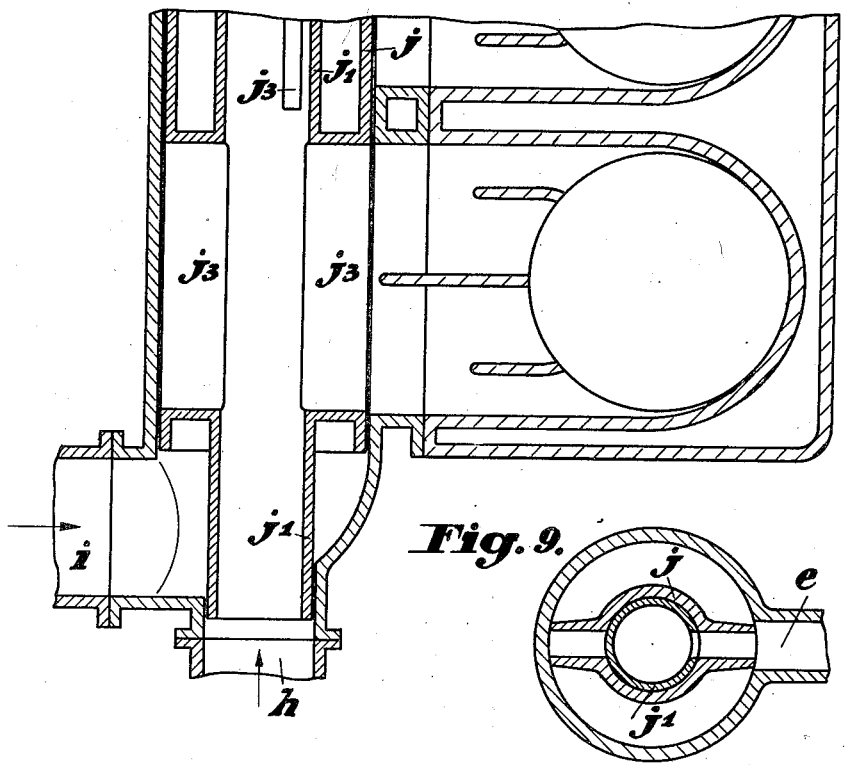
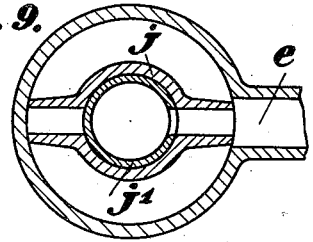

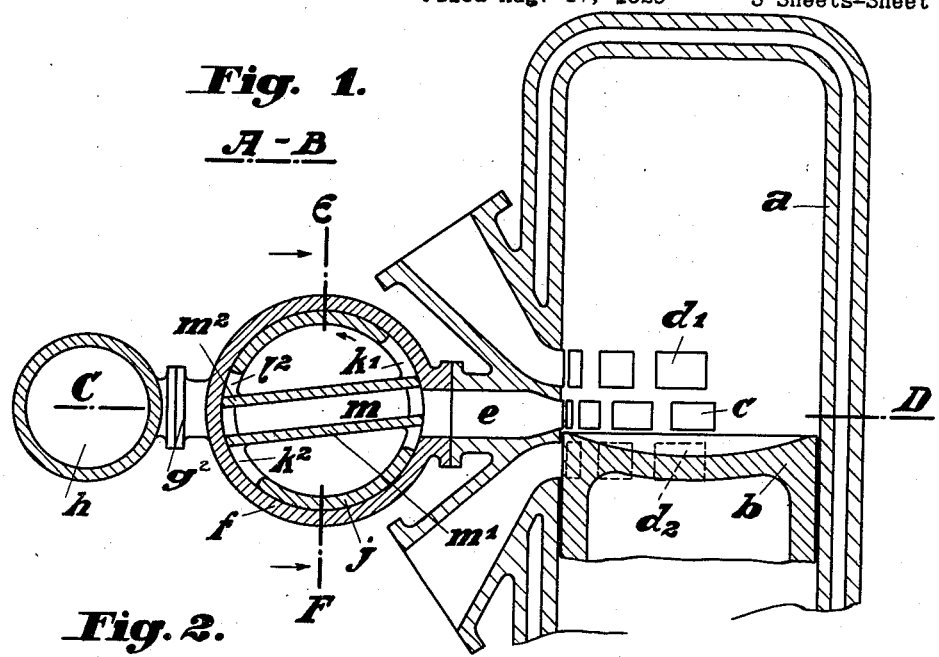
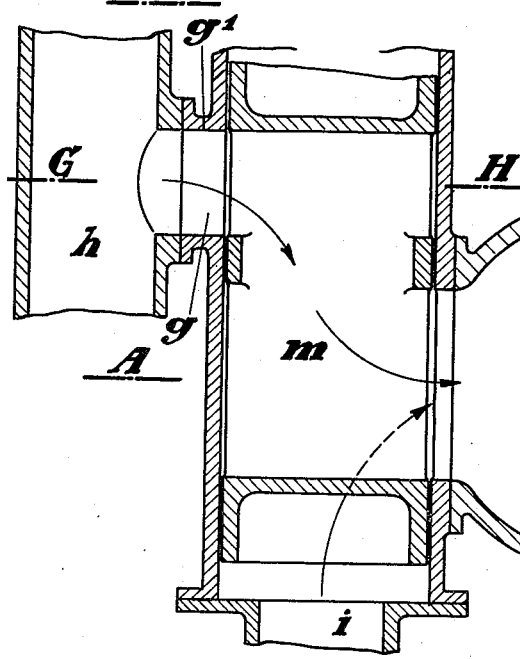
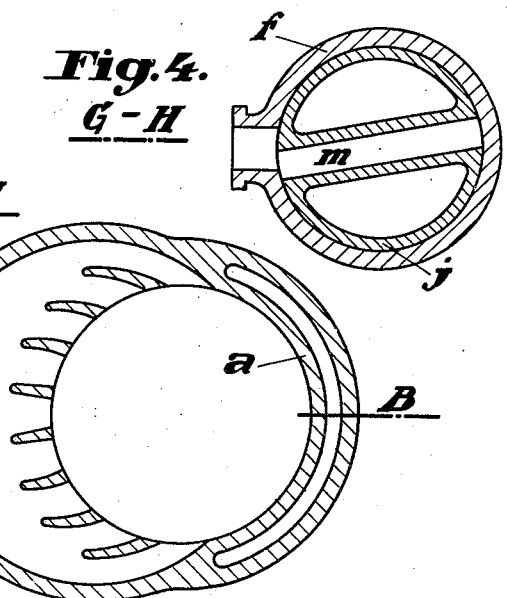

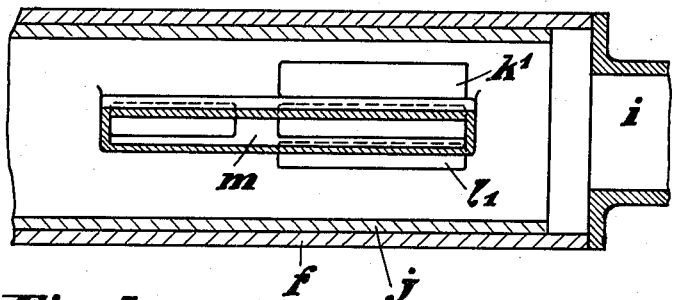
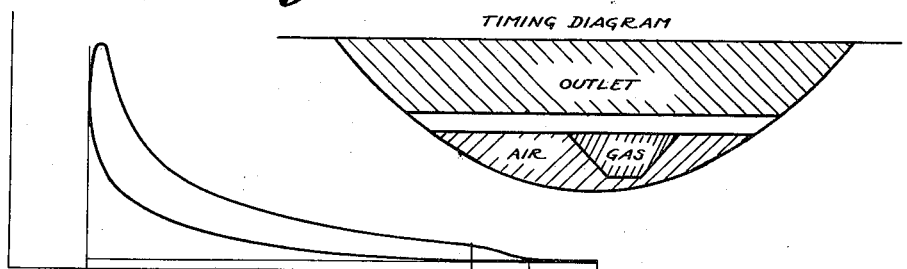
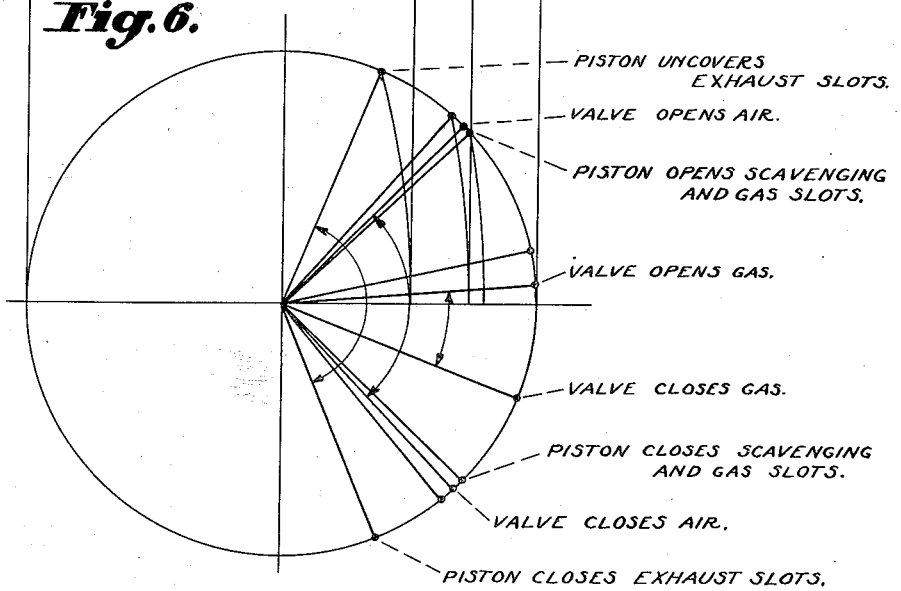

Patented Apr. 14, 1931

1,800,433

UNITED STATES PATENT OFFICE

HANS BULLNHEIMER, OF AUGSBURG, GERMANY, ASSIGNOR TO MASCHINENFABRIK AUGSBURG-NURNBERG A. G., OF AUGSBURG, GERMANY, A CORPORATION OF GERMANY

TWO-CYCLE ENGINE WITH SLOT SCAVENGING

Application filed August 17, 1929, Serial No. 386,712, and in Germany August 22, 1928.

This invention relates to internal combustion engines and more particularly to two-stroke cycle engines.

One object of the invention is the provision in a two-stroke cycle engine having a piston controlled exhaust and inlet valves, of means in addition to the piston for automatically controlling the admission of gas and scavenging air to the cylinder.

Other objects and advantages of the invention will be apparent from the following description and claims from the accompanying drawings, in which—

Fig. 1 is a longitudinal vertical section through an engine cylinder embodying the present invention and showing the control valve in transverse section;

Fig. 2 is a transverse section through the cylinder taken on the line C—D of Fig. 1 and showing the control valve in longitudinal section;

Fig. 3 is a longitudinal section through the control valve, taken along the line E—F of Fig. 1;

Fig. 4 is a transverse section through the control valve along the line G—H of Fig. 2;

Fig. 5 is a diagrammatic view of the timing curve;

Fig. 6 is a diagrammatic representation of the pressure and of the timing of the various successive operations;

Figs. 7 and 8 are cross-sectional views corresponding to Figs. 1 and 2 but representing a modified form of construction, and;

Fig. 9 is a transverse section through a modified form of control valve.

This invention is preferably employed in connection with a two-stroke cycle engine adapted to operate upon an explosive mixture, a double acting engine having a suitable number of cylinders being shown in the drawings as illustrative of the arrangement of the various parts.

In prior constructions of engines of this general class, scavenging air slots and gas inlet slots have been so provided in the cylinder walls that they are opened successively by the piston, being arranged in axially displaced planes so that the scavenging air slots are opened somewhat before the gas inlet slots are opened to provide a stratum of air between the entering fuel and the burnt gases that are being exhausted from the cylinder. This air stratum should be of such a degree that it will prevent contact of the fuel mixture with the hot exhaust gases being exhausted, to prevent pre-ignition of the incoming fuel. To meet this requirement there must be a comparatively large distance between the gas inlet slots and the scavenging air slots, and this distance results in a loss of a portion of the stroke that would otherwise be effective.

In accordance with this invention the disadvantages of the mentioned arrangement are avoided, and a comparatively late gas intake is present, the gas intake succeeding a rather large previous flow of scavenging air.

A control device such as a suitable valve is therefore provided to cooperate with the piston for the control of the intaken gas and air, the arrangement being such that there is an admision of scavenging air followed by an admission of gas of varying richness, after which there is a flow of scavenging air alone to insure the entire utilization of all of the fuel.

Referring now to the drawings the engine cylinder $a$, which may be supplied with suitable means such as a spark plug or the like, not shown, for causing the ignition of the compressed fuel mixture, is provided with exhaust ports or slots $d_1$ through which the burnt gases travel from the combustion chamber. Inlet slots or ports $c$ are provided in the cylinder walls preferably on the same side of the cylinder so that the flow of scavenging air takes place across the top or the piston, along the far side of the cylinder, then reverses back and down along the cylinder to a point adjacent the inlet. In other words a reverse scavenging flow is thus provided for. A single row of inlet slots $c$ may be used at the center of a double acting cylinder construction to supply both ends of the cylinder, the two sets of outlet or exhaust slots $d_1$ and $d_2$ being suitably spaced towards the respective ends of the cylinders so that the piston $b$ successively uncovers the inlet and the exhaust slots at either end.

The inlet slots $c$ as shown in Figs. 1 and 2 are connected to a control device shown in the form of a valve, the conduit $e$ forming a means of communication between the slots $c$, and the valve. The valve in turn is connected with a gas pipe $h$, suitable flanges $g_2$ being provided as a means of connection between these parts and between the valve and the conduit $e$.

The valve comprises a housing or sleeve $f$ in which is rotatably mounted a suitable control member preferably in the form of a tube $j$ which operates in timed relation with the piston, being driven from the cam shaft of the engine. The arrow shown in Fig. 1 indicates the direction of this sleeve. There are two oppositely disposed air outlet openings in this sleeve adapted to communicate with the passage $e$, these openings being in part defined by the walls $m_1$ and $m_2$ of the gas conduit $m$ which extends through the middle of the sleeve so that it is substantially surrounded by the scavenging air passages. The openings $k_1$ and $l_1$ for the upper side of the piston are adapted to register successively with the conduit $e$ while the openings $k_2$ and $l_2$ for the lower side of the piston also register successively with the supply conduit $e$, when the piston is at the other end of the double cylinder.

As shown in Fig. 1 the opening $k_1$ is substantially larger than the opening $l_1$, and opening $k_2$ is larger than opening $l_2$. The openings $k_1$ and $l_1$ may be of the same size, if desired, and located symmetrically opposite the opening at the end of the gas conduit $m$, but the arrangement shown in Fig. 1 is preferably under many conditions. The size and relative proportions of these openings is somewhat dependent upon the size of the passage $e$ so that sufficient air will flow through the valve after the passage of gas stops to completely fill the passage $e$ and move all of the explosive gas from this passage into the cylinder.

The gas inlet opening in the sleeve $j$ is offset from the air openings $k_1$ and $l_1$ and $k_2$ $l_2$ in a direction longitudinally of the sleeve (see Fig. 2). The gas conduit $m$ preferably extends through the center of the sleeve and has its inlet opening at one end portion while the outlet opening is axially displaced, so that the gas moves radially into the sleeve, then moves along the sleeve in a general axial direction, and then leaves the sleeve in a radial direction. It is thus possible to use both the outlet openings in the rotatable sleeve for the gas as well as for the air. The air preferably moves axially through the sleeve in the two passages positioned on opposite sides of the gas passage $m$ so that when the openings $k_1$ or $l_1$ are in communication with the passage $e$ the scavenging air can flow into the cylinder if the inlet slots are open at the time.

The sleeve is so positioned and operated with relation to the piston, that the flow of air through the opening $k_1$ starts shortly before the piston begins to open the scavenging slots $c$. With the air outlet openings in the sleeve arranged unsymmetrically, as shown in Fig. 1, the gas introduction into the passage $e$ will take place in a manner as represented in Figs. 5 and 6. The scavenging and charging cycle for the upper side of the piston, as shown in those figures, is as follows: The piston $b$ opens the outlet slots $d_1$ during the expansion stroke so that the burnt gases in the cylinder may expand to atmospheric pressure. Before the inlet slots $c$ are opened by the piston the movement of the sleeve $j$ in the direction of the arrow shown in Fig. 1 has slightly opened the passage $k_1$ and connected the passage $e$ to the scavenging air supply. The inlet slots $c$ are then opened by the piston and a flow of scavenging air takes place through the inlet slots $c$ and the burnt gases remaining in the cylinder are forced out ahead of this scavenging air flow, a stratum of scavenging air thus following along after the burnt gases. This flow of scavenging air takes place until or just shortly before the piston reaches its lower dead center position during which movement of the piston the control valve has turned so that the opening $k_1$ is in full registration with the passage $e$. Further turning of the control sleeve $j$ brings the gas passage $m$ into partial registration with the passage $e$ while the opening $k_1$ also remains in communication with that passage, the size of the gas passage opening increasing as the size of the opening $k_1$ decreases. Gas thus enters the cylinder through the conduit $m$ and air enters through the slot $k_1$, the flow of gas steadily increasing at first as the gas passage $m$ moves to exact registration with the conduit $e$, and thereafter decreasing while the air flow increases as the gas passage $m$ moves on and the air passage $l_1$ opens. Finally the flow of gas through the passage $m$ is stopped entirely and the opening $l_1$ then permits a flow of air so that any mixture still remaining in the chamber $e$ is forced along into the cylinder. Thus when the slots $c$ are closed by the piston during its return movement, the chamber $e$ is free of gas and there is no loss or waste of gas during the following scavenging period, and no tendency for back firing to take place in the passage $e$.

It will just be understood that at first, clean scavenging air is supplied to the cylinder and this is followed by a mixture of gas and air which gradually increases in richness and then decreases again in richness. This gas mixture is followed through the passage $e$ by a stratum of pure air sufficient to force all of the gas mixture into the cylinder, and some of this following stratum of pure air also enters the cylinder to insure the complete removal of the gas content from the chamber e. The rich gas entering the cylinder therefore remains out of contact with the hot exhaust gases which are removed from the cylinder.

The operation of the engine is preferably the same at opposite ends thereof.

In multicylinder engine construction, in accordance with this invention there is preferably only one scavenging air lead at one end of the control sleeve which is arranged for the control of all of the cylinders. The gas supply passages to the cylinder, however, may be arranged individually from the gas supply pipe $h$, as shown in Figs. 1 and 2. If desired however a common scavenging air connection may be used for the several cylinders, and a common gas lead also provided. Thus as shown in Figs. 7, 8 and 9 the control sleeve $j$ is made with an internal tube $j_1$ which has a series of openings $j_3$ communicating with the various cylinders, the walls $j_2$ of the valve forming the gas conduit. The gas inlet into the inner tube is from pipe $h$, arranged axially of the tube, while the air inlet to the outer passages in the sleeve is through the pipe $i$. The air passages substantially enclose the gas passage in the valve.

In the modified form of construction shown in Fig. 9 the tubular passage $j_1$ which acts as a gas supply passage in the valve is fixed in position and is surrounded by the rotatable sleeve $j$ which operates in timed relation with the piston. With this arrangement there is a complete separation of the gas from the air lead. The method of operation however in this form of construction and in the form shown in Figs. 7 and 8 is substantially the same as in the construction represented by Figs. 1 and 2.

It will thus be seen, that in accordance with this invention contact of the fresh gas entering the cylinder with the hot exhaust gases leaving the cylinder will be prevented and preignition tendencies will be obviated. The entire quantity of burnt gases in the cylinder will be scavenged without the loss however of any fresh fuel or gas. As the inlet slots provide for a flow of both scavenging air and gas the complete scavenging of the burnt gases and the supply of an explosive mixture to the cylinder will take place in a comparatively small proportional part of the piston stroke.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A two-stroke cycle internal combustion engine having a cylinder provided with a series of inlet slots for admitting both gas and air and exhaust slots, all adapted to be controlled by the piston, a piston operating in said cylinder and an automatically operating control valve for controlling the flow of both the gas and the air to all of the inlet slots.

2. A two-stroke cycle internal combustion engine having a cylinder provided with a series of inlet slots for admitting both gas and air and exhaust slots, all adapted to be controlled by the piston, a piston operating in said cylinder, additional valve means automatically operable in accordance with the movements of the piston for controlling the flow of gas to said inlet slots, and additional valve means automatically operable in accordance with the movements of the piston controlling the flow of scavening air to said inlet slots.

3. A two-stroke cycle internal combustion engine having a cylinder provided with a series of inlet slots for admitting both gas and air and exhaust slots, all adapted to be successively controlled by the piston, a piston operating in said cylinder, and valve means automatically controlling the flow of gas and the flow of scavenging air to all of said inlet slots.

4. A two-stroke cycle internal combustion engine having a cylinder provided with a series of inlet slots for admitting both gas and air and exhaust slots, all adapted to be controlled by the piston, a piston operating in said cylinder, and a valve operating in timed relation with the piston having a gas controlling passage and a scavenging air controlling passage adapted to function successively in cooperation with said series of inlet slots.

5. A two-stroke cycle internal combustion engine having a cylinder provided with a series of inlet slots for admitting both gas and air and exhaust slots, all adapted to be controlled by the piston, a piston operating in said cylinder, and a valve operating in timed relation with the piston having a gas controlling passage and a scavenging air controlling passage adapted to function successively in cooperation with said inlet slots to supply air before, during, and after the supply of fuel to the series of inlet slots.

6. A two-stroke cycle internal combustion engine having a cylinder provided with a series of inlet slots for admitting both gas and air and exhaust slots, all adapted to be controlled by the piston, a piston operating in said cylinder, and a tubular control sleeve operating in timed relation with the piston and having a fuel supply passage extending therethrough and a scavenging air supply passage on each side thereof, the three passages being adapted for successive registration with the inlet slots.

7. A two-stroke cycle internal combustion engine having a cylinder provided with inlet and exhaust slots adapted to be controlled by the piston, a piston operating in said cylinder and a tubular control sleeve operating in timed relation with the piston having a fuel supply passage and air supply passages, one of said air supply passages becoming effective a predetrmined time ahead of the opening of said fuel supply passage, and another air passage remaining effective a time substantially shorter than said predetermined time, after the closing of said fuel supply passage.

8. A two-stroke cycle internal combustion engine having a cylinder provided with a series of inlet slots for admitting both gas and air and exhaust slots, all adapted to be controlled by the piston, a piston operating in said cylinder, and a tubular control sleeve operating in timed relation with the piston, one portion of said sleeve having gas and air passages adapted to successively communicate at predetermined times with said inlet slots, and an axially displaced portion of said sleeve having a gas supply opening and an air supply opening through which gas and air are respectively supplied to said sleeve.

9. A two-stroke cycle internal combustion engine having a cylinder provided with inlet and exhaust slots adapted to be controlled by the piston, a piston operating in said cylinder, and a tubular control sleeve operating in timed relation with the piston having a gas passage extending diametrically across the sleeve and communicating at predetermined times with said inlet slots, the sleeve having an air supply passage extending longitudinally thereof and having portions on opposite sides of said gas passage adapted to be successively placed in communication with said inlet slots.

10. A two-stroke cycle double acting internal combustion engine having a cylinder provided with inlet and exhaust slots adapted to be controlled by the piston, a piston operating in said cylinder, and a tubular control sleeve operating in timed relation with said piston for cooperation with said slots for the supply of scavenging air, then fuel and air, and then air alone, said tubular control sleeve having an inner passage acting as a gas supply passage, and scavenging air supply passages surrounding said gas inlet passage.

In testimony whereof I have affixed my signature.

HANS BULLNHEIMER.